Figure 1:
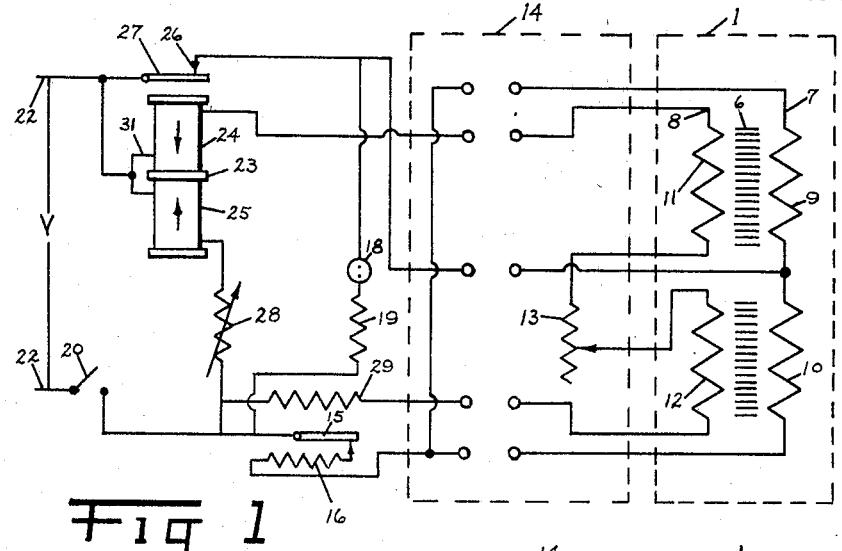

Sept. 8, 1959  E. R. MILLS  2,903,548
ELECTRIC BLANKET CONTROL
Filed Sept. 4, 1957  2 Sheets-Sheet 1

INVENTOR
EDWIN RAY MILLS
BY
ATTORNEY

Sept. 8, 1959            E. R. MILLS            2,903,548

ELECTRIC BLANKET CONTROL

Filed Sept. 4, 1957            2 Sheets-Sheet 2

INVENTOR
EDWIN RAY MILLS
BY
ATTORNEY

United States Patent Office 2,903,548
Patented Sept. 8, 1959

2,903,548

ELECTRIC BLANKET CONTROL

Edwin Ray Mills, Leaksville, N.C., assignor to Fieldcrest Mills, Inc., Spray, N.C., a corporation of Delaware Application September 4, 1957, Serial No. 681,934

5 Claims. (Cl. 219—20)

This invention relates to electrically heated fabrics such as blankets and has for its object the provision in a fabric of this character of improved means for controlling the heating circuit thereof and more specifically the provision of an improved secondary safety control for protecting the fabric, such as a blanket, against overheating.

It is known that overheating in the body of electric blankets can be caused by certain types of bunching, folding or rolling of the fabric or by placing heavy objects upon an otherwise normally energized blanket, resulting in abnormally high temperatures in such areas. A common practice to protect the blanket against such conditions has been to locate within the blanket body and usually in series with the heater conductor, a number of thermostats whose function has been to interrupt the heating circuit in response to predetermined abnormally high temperatures. The protection afforded by this system, however, is limited since it is not economically feasible or practical to include enough thermostats to protect the entire blanket.

In the thermostat type blanket, that is, one which employs thermostats in the blanket body, there is essentially only one control circuit which is directed principally to the function of maintaining a substantially uniform temperature in the blanket for the sake of comfort, the function of protection against overheating in the blanket being taken care of solely by thermostats located in the blanket body. Unlike the thermostat type blanket, this invention provides, in addition to the conventional comfort control, a secondary safety or overheat control which operates independently of the primary comfort control, and protects the blanket from overheating without employing thermostats in the blanket body.

It is known to provide in an electric blanket a secondary safety control of the thermostatless type, that is, one does not employ thermostats in the blanket body, by using the change in resistance with temperature of a blanket element having a single heating conductor of suitable material as a control means to protect the blanket body from overheating. Also known is the practice of providing a two conductor element in which one conducotr acts as a heating conductor with a relatively stable resistance and whose sole purpose is to provide heat to the blanket body while the other conductor acts as a feeler conductor whose resistance is specifically designed to change substantially with temperature, usually positively; the second conductor serving to measure the temperature in the blanket body and acting as a secondary safety control means to break the flow of current to the first heating conductor upon the obtaining of abnormally high temperatures in the blanket body such as caused by folding, bunching, rolling and the like. The two conductor heating element has the advantage that the feeler conductor which is usually adjacent to but insulated from the heating conductor can be of a material having a relatively high temperature coefficient of resistance, preferably positive, such as nickel and at the same time, the heating conductor can be of a material having a relatively low temperature coefficient of resistance such as an alloy made of copper with a small percent of cadmium. Thus, the heating conductor can be designed specifically for the purpose of heating and the feeler conductor can be designed specifically for detecting abnormal changes in temperature in the blanket body resulting in a distinct advantage over the system employing a single conductor blanket element which attempts to serve both as a source of heat and as a control device. While the basic principles and advantages of the use of a two conductor blanket element in an electric blanket have been known for sometime, considerable effort has been expended in the industry in trying to devise a simple and low cost secondary control circuit for association with the primary comfort control circuit and with the feeler conductor and the heating conductor of a two conductor element whereby the feeler conductor will act to deenergize the heating conductor upon the obtaining of abnormal temperatures.

Among the prior art, differential relays have been used with two conductor blanket element secondary safety controls in electrically heated blankets in which a magnetomotive force produced by the heater conductor current is balanced against a magnetomotive force produced by the feeler conductor current. While a differential relay offers many manufacturing and operating advantages over bridge, transformer and other types of circuits known in the art, I have made the important observation that in conventional circuits of this type which employ a differential relay and in fact, in many of the known bridge circuits devised for the same purpose, the two effects being compared, such as magnetomotive forces in a differential relay, are both in fact subject to at least some variation with increase in blanket body temperature since the conductors whose resistances are controlling such effects are both physically located in the heated portions of the blanket body. Thus, one variable is, in effect, being compared against another variable. In the secondary safety circuit of this invention, a more ideal arrangement is achieved in that the feeler conductor current is used to produce a magnetomotive force in one coil of a differential relay which is compared against a magnetomotive force produced in a second coil of the same relay by the passage of current through a relatively stable circuit which is physically isolated from the temperature prevailing in the blanket body. Thus, in the circuit of this invention a variable, namely, the magnetomotive force caused by the feeler conductor current and representing a measure of the temperature prevailing in the blanket body, is compared against a constant, namely, a separate, relatively fixed magnetomotive force whose force is entirely independent of the blanket temperature. Such a circuit as hereinafter described gives a more positive measure of abnormal temperature and, therefore, a more positive cut-off in the event of abnormally high temperatures in the blanket body since the magnetomotive force controlled by the blanket body temperature is, in effect, being compared against a relatively constant magnetomotive force rather than one which also tends to change with blanket body temperature. Furthermore, by using a differential relay as the comparing device for the circuit of this invention, I have devised a secondary safety control employing a two conductor element which is rugged in performance, cheap in cost, simple in manufacture and a circuit which is relatively unaffected by normal voltage fluctuations encountered in household use and one which will automatically restart after power outages.

Figure 2:
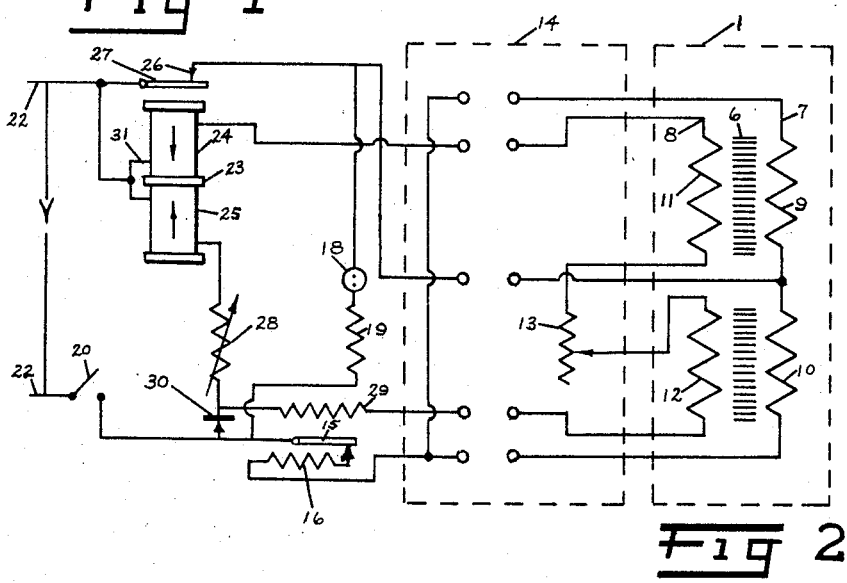
Figure 3:
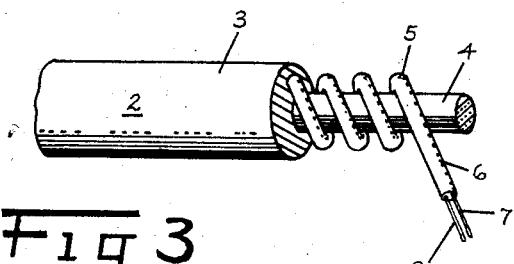
Figure 4:
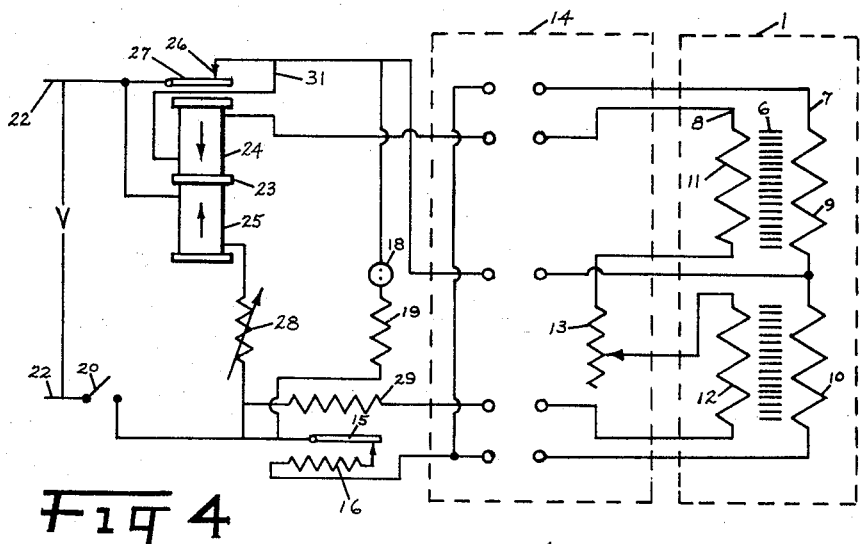
Figure 5:
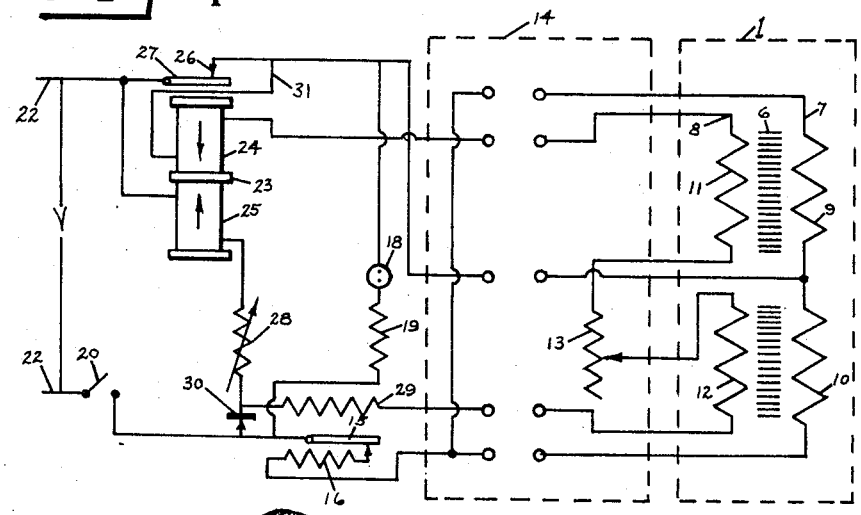
Figure 6:
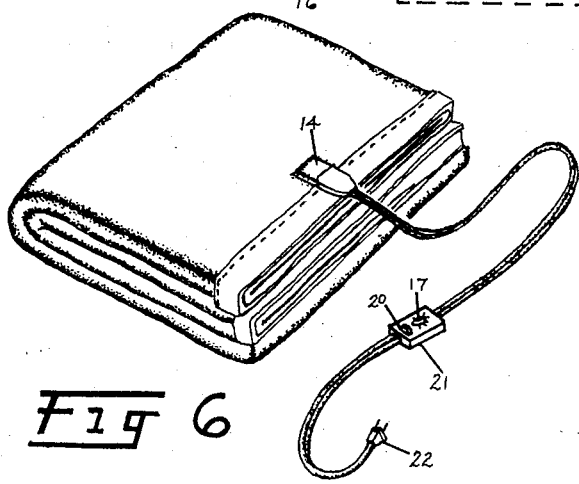

For a more complete understanding of this invention, reference should be made to the drawings in which Figure 1 shows an electrical diagram of the improved secondary safety control circuit in association with a typical primary temperature or comfort control circuit for an electric blanket and wherein the entire circuit is designed for alternating current and automatic reset operation. Figure 2 is similar to Figure 1 except that the secondary safety control is designed for direct current operation of certain portions of the circuit. Figure 3 shows one form of two conductor blanket element which has been found suitable for the purposes of this invention. Figure 4 is similar to Figure 1 except that the circuit is designed for manual reset operation. Figure 5 is similar to Figure 2 except that the circuit is designed for manual reset operation. Figure 6 shows the general relation of the blanket, the blanket terminal, the control housing and the power plug.

Referring to Figure 1, numeral 1 represents the blanket body which may be of conventional channel construction and which includes a flexible two conductor heating and thermosensitive element 2 having, as best shown in Figure 3, an outer insulating jacket 3, an inner supporting core 4, a two conductor element 5, spirally wound around core 4 and comprised of an insulating sheath 6 separating and insulating, one from the other, heater conductor 7 and feeler conductor 8. While other forms of conductor arrangements would function in this invention, this particular arrangement has been found to have substantial flexibility, long life and to be best suited to the purposes of this invention.

Heater conductor 7 is shown as being comprised of the two conventional parallel branches 9 and 10, conductor 7 being of a material having a low temperature coefficient of resistance relative to that of feeler conductor 8. As indicated above, any of the commonly employed heater conductor materials such as copper are subject to some change in resistance, which makes the circuit of this invention particularly advantageous. However, whatever heater conductor material is chosen, it should preferably have a resistance which is relatively stable with temperature change. Feeler conductor 8 is comprised of two series sections 11 and 12 in order to provide in series with feeler conductor 8 a variable resistor 13. Feeler conductor 8 is made of a material having a relatively high temperature coefficient of resistance relative to that of the heater conductor 7 thus providing a flexible thermosensitive device in spaced, insulated and heat transfer relation with heater conductor 7 and blanket body 1. Variable resistor 13 is used, if necessary, to add resistance to feeler conductor 8 in order to allow a greater manufacturing tolerance in the plus and minus limits of resistance in feeler conductor 8. Variable resistor 13 should preferably be located out of the heated area of the blanket body. Associated with the foregoing parts is blanket terminal connection 14 which may take the form of the terminal connection described in the now pending application, "Electrical Connector and Method of Making Same," filed February 2, 1956, Serial No. 563,031 by Burton P. Franklin, now U.S. Patent No. 2,850,712, and assigned to the same assignee as this invention.

In order to better understand the relation of the secondary safety control of this invention to the basic temperature control, there is shown a typical comfort control in which 15 represents a bimetal switch that cycles in response to ambient temperature and heat emitted by resistor 16 so as to maintain a substantially uniform temperature in blanket body 1 as determined by the setting of bimetal control knob 17 shown in Figure 1. If desired, a pilot light 18 with current limiting resistor 19 may be employed to indicate to the user of the blanket when the same is energized.

Numeral 20 represents an on-off switch mounted in control case 21, shown in Figure 6, which is used for energizing the entire control from a suitable voltage source V through power leads 22. It should be understood that those parts shown in Figure 1 which are not included in the dashed line indicating terminal 14 or the dashed line indicating blanket body 1 are to be considered as being preferably mounted within the control case 21 shown in Figure 6. Also mounted in control case 21 is differential relay 23 having two magnetically opposed coils 24, 25 and normally closed contacts 26 controlled by armature 27, armature 27 pulling in and opening contacts 26 only when there is a net flux in differential relay 23. As stated, contacts 26 are normally closed which condition may be maintained by a spring or any of the other well known devices used in differential relays for this purpose. Contacts 26 remain closed so long as the ampere turns of coil 24 balance the ampere turns of coil 25. However, when the ampere turns of either coil exceed, in a predetermined amount, the ampere turns of the other, armature 27 is pulled in, opening contacts 26. In series with coil 25 is variable resistor 28 and in series with feeler conductor 8 is current limiting resistor 29; resistor 29 being useful in the event of a short circuit within blanket body 1. It is apparent that the variable resistors 13, 28 each is equivalent to an adjustable rheostat means.

To explain the operation of the circuit described in Figure 1, it will be noticed that branches 9, 10 of heater conductor 7 are supplied by current from voltage source V which passes through contacts 26 on one side of the heater conductor 7 and through resistor 16, bimetal 15 and on-off switch 20 on the other side of heater conductor 7. While on-off switch 20 is pictured in the off position in Figure 1, it would, of course, be in the on position during normal operation of the control. In insulated but close heat transfer relation with heater conductor 7 is feeler conductor 8. Current flow through feeler conductor 8 passes from one side of voltage source V through relay coil 24, through feeler conductor branch 11, through variable resistor 13, through branch 12 and through current limiting resistor 29. As previously mentioned, feeler conductor 8 is formed of material having a high coefficient temperature of resistance, preferably positive, so that the total resistance of the series path which includes coil 24, branch 11, variable resistor 13, branch 12 and current limiting resistor 29 is dependent primarily on the temperatures at which the branches 11, 12 of feeler conductor 8 are operating. The resistance of feeler conductor 8 is such that it passes only a negligible current. Therefore, the feeler current itself has only a negligible effect on the temperature being measured. Consequently, the magnetomotive force developed by the ampere turns of coil 24 is dependent principally on the temperature prevailing around feeler conductor 8, thus coil 24 in effect directly measures the temperature of blanket body 1. It should be particularly noted that the resistance being measured is that of feeler conductor 8 which is separate and apart from heater conductor 7, the resistance of the latter not being employed in this invention as a measure of the temperature of blanket body 1.

Paralleling the feeler conductor circuit is a separate series path which includes relay coil 25 and variable resistor 28. As pictured in Figure 1, the magnetomotive force developed by the ampere turns of relay coil 25 opposes the magnetomotive force developed by the ampere turns of relay coil 24. However, with any given setting of variable resistor 28, the total resistance of the circuit which includes relay coil 25 and variable resistor 28 remains substantially constant so that the ampere turns and consequently the magnetomotive force developed by relay coil 25 remains substantially constant irrespective of any rise or fall in the temperature prevailing in blanket body 1. Thus, the magnetomotive force developed by relay coil 25 furnishes a relatively constant magnetomotive force against which the magnetomotive force developed by relay coil 24, representing the temperature of blanket body 1, may be compared. It will be observed that in effect the secondary safety control of this invention provides three parallel circuits energized by a common voltage source V; a heating circuit which includes heater conductor 7, a feeler circuit which includes differential relay coil 24 and feeler conductor 8 and a steady state circuit which includes differential relay coil 25.

During manufacture of the control of this invention, the resistance of variable resistor 13 and variable resistor 28 are adjusted to cause substantially equal ampere turns to be present in coils 24 and 25 so long as the resistance of feeler conductor 8 remains within a range corresponding to the normal temperature range of blanket body 1. However, the resistance of feeler conductor 8 is so designed and the variable resistances 13 and 28 are so adjusted that once the temperature in blanket body 1 in and around any portion of feeler conductor 8 is in excess of its normal highest temperature, such as might be caused by bunching, folding and the like, the resistance of feeler conductor 8 changes sharply, preferably increasing, thus throwing the magnetomotive forces produced by relay coils 24 and 25 out of balance, causing armature 27 to pull in which opens contacts 26 and breaks the flow of current to heater conductor 7. For example, if feeler conductor 8 has a relatively high positive coefficient temperature of resistance, as the temperature in blanket body 1 increases, say because of a bunched condition, the flow of current through relay coil 24 will decrease until a point is reached at which the ampere turns of relay coil 25 will sufficiently exceed the ampere turns of relay coil 24 to overcome the bias to normally closed position of armature 27 and open contacts 26. Contacts 26 will remain open until the temperature in blanket body 1 falls back into the normal operating temperature range of the blanket, such a characteristic being customarily termed "automatic reset."

The circuit shown in Figure 2 is similar to that shown in Figure 1 except that rectifier 30 has been added for the purpose of allowing differential relay 23 to operate on direct current. As is well known, a D.C. differential relay offers some advantages in cost, cut-off, and gives less noise than does an A.C. differential relay. If desired, such a D.C. differential relay could be used for the purposes of this invention. The circuit described in Figure 4 is similar to that shown in Figure 1 except that it will be noted that the in-coming lead 31 to coil 24 has been rearranged so that the opening of contacts 26 will serve to break the flow of current to coil 24. Thus, in this type of circuit, a manual resetting operation is required due to the fact that once contacts 26 are open, they will not reclose until the user opens and closes on-off switch 20 which will restore the safety circuit to operating condition providing the abnormal temperature has declined to be within a normal operating range. The circuit shown in Figure 5 is similar to that shown in Figure 2 except that, somewhat like the circuit shown in Figure 4, lead 31 has been arranged for manual reset operation. Thus, in this circuit which is designed for D.C. operation of the differential relay 23, an opening and closing of on-off switch 20 would be required to restore the circuit to normal operation whenever contacts 26 are opened upon the obtaining of an abnormally high temperature. Figure 6 shows the general relation of the blanket body 1, the terminal connection 14, the bimetal control knob 17, the on-off switch 20, the control housing 21, and the power leads 22, the manner in which the blanket is folded in Figure 6 is a common overheat situation encountered in household use of electric blankets. Were the power leads 22 to be placed in a wall outlet and the on-off switch 20 turned on while the blanket was so folded, the secondary safety control of this invention would operate and prevent scorching, fire and the like.

As previously stated, it should be observed that the circuit which includes differential relay coil 25 and variable resistor 28 furnishes, for any selected setting of variable resistor 28, a magnetomotive force which is comparatively constant; which force, being thermally isolated from the effects of blanket element 2, is independent of any changes in temperature in blanket body 1. Thus, the variable magnetomotive force developed in differential relay coil 24 and representing the blanket temperature prevailing around feeler conductor 8 has available to it a constant opposing magnetomotive force developed by differential relay coil 25. In conjunction with this feature, it should also be noted that both forces are compared within a single differential relay 23, in whch the net force acts directly on armature 27. Thus, whenever the net force in differential relay 23 reaches a predetermined amount, as might be caused by an abnormally high temperature in blanket body 1, contacts 26 are opened because of such force. The result is a secondary safety control which, while effective for the purpose of blanket overheat protection, has few components and is cheap to manufacture.

While I have shown and described an embodiment of my invention as applied to electric blankets, it will be obvious to those skilled in the art that changes may be made without departing from my invention and, therefore, I aim in the appended claims to cover all such changes and modifications as fall within the true spirit and scope of my invention.

What I claim as new and desire to secure by Letters Patent of the United States is:

1. A safety control for an electric blanket of the type having a main heating conductor in said blanket comprising, in combination, a thermostat for controlling the energization of said heating conductor from an associated source of power for normal operation of said blanket, a relay having a pair of first and second differentially wound coils for also controlling the energization of said heating conductor from said source of power independently of said thermostat, a control conductor positioned within said blanket in heat transfer relationship therewith, said control conductor having a resistance which varies proportionally with the heat in said blanket, a first circuit connecting said first coil and said control conductor in series across said source of power, a second circuit connecting said second coil to said source of power whereby an abnormal temperature in said blanket sensed by said control conductor produces an imbalance between the currents flowing through said coils, and said relay is actuated to interrupt the energization of said heating conductor, and resistance means associated with at least one of said relay coils for calibrating said relay.

2. A safety control in accordance with claim 1 wherein said resistance means include a variable resistor in series with said second coil.

3. A safety control in accordance with claim 1 wherein said resistance means include a variable resistor in series with said control conductor and said first coil.

4. A safety control in accordance with claim 3 wherein said blanket has an electrical terminal connector mounted thereon and said variable resistor is positioned within said terminal connector.

5. A safety control for an electric blanket of the type having a main heating conductor in said blanket comprising, in combination, a thermostat for controlling the energization of said heating conductor from an associated source of power for normal operation of said blanket, a relay having a pair of differentially wound coils for controlling the energization of said heating conductor from said source of power independently of said thermostat, a control conductor positioned within said blanket in heat transfer relationship therewith, said control conductor having a resistance which varies proportionally with the heat in said blanket, a first circuit connecting one of said coils and said control conductor in series across said associated source of power, a second circuit connecting the other coil to said source of power whereby an abnormal temperature in said blanket sensed by said control conductor produces an imbalance between the currents flowing through said coils and whereby said relay is actuated to interrupt the energization of said heating conductor, a variable resistor in series with said other coil, an electrical terminal connector mounted on said blanket, and a variable resistor in said terminal connector in series with said control conductor and said one coil.

References Cited in the file of this patent

UNITED STATES PATENTS

| | | |
|---|---|---|
| 1,528,053 | Hands | Mar. 3, 1925 |
| 2,475,309 | Chalberg | July 5, 1949 |
| 2,549,095 | Huck | Apr. 17, 1951 |
| 2,552,480 | Dickey | May 8, 1951 |
| 2,592,525 | Huck | Apr. 15, 1952 |
| 2,709,216 | Moran et al. | May 24, 1955 |
| 2,794,896 | Huck | June 4, 1957 |
| 2,801,317 | Goldmuntz et al. | July 30, 1957 |